Figure 1:
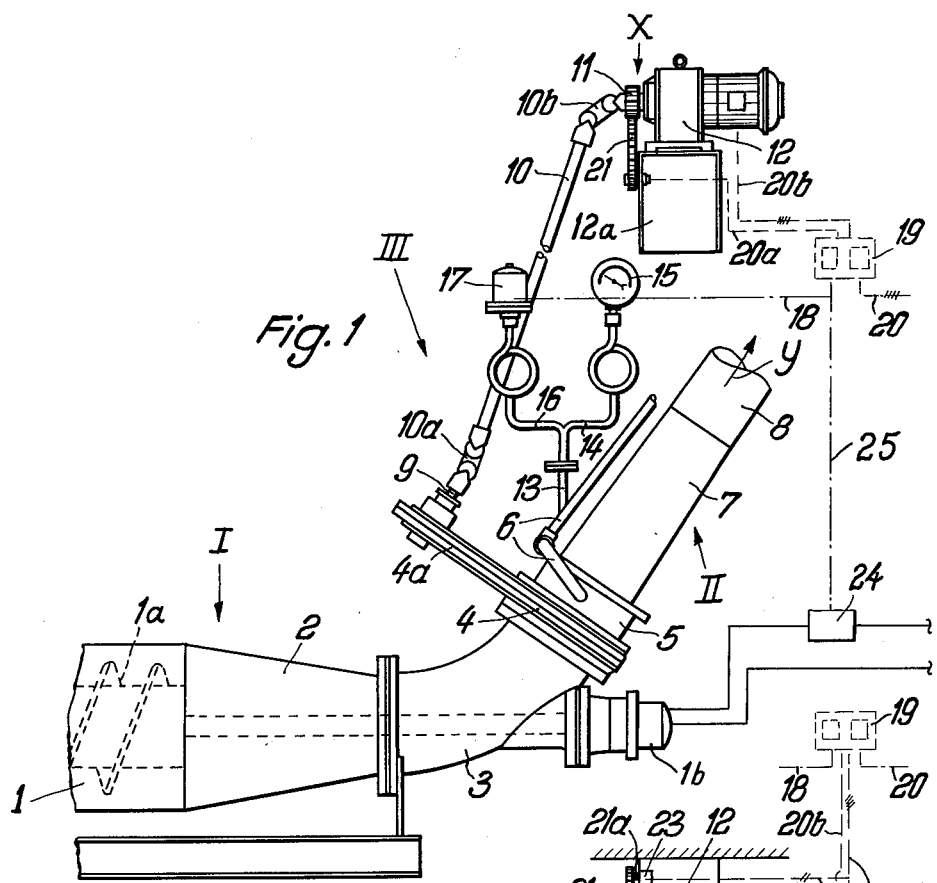

July 30, 1963

W. PONNDORF 3,099,495

CONVEYING ARRANGEMENT FOR PULPY MATERIALS, SUCH
AS DISTILLER'S GRAINS AND THE LIKE

Filed Jan. 12, 1961

Inventor:
WILHELM PONNDORF
BY Michael S. Striker
his ATTORNEY

United States Patent Office 3,099,495
Patented July 30, 1963

3,099,495
CONVEYING ARRANGEMENT FOR PULPY MATERIALS, SUCH AS DISTILLER'S GRAINS AND THE LIKE
Wilhelm Ponndorf, Kassel, Germany, assignor to Ponndorf Maschinenfabrik K.G., Kassel-Bettenhausen, Germany
Filed Jan. 12, 1961, Ser. No. 82,281
Claims priority, application Germany Jan. 21, 1960
2 Claims. (Cl. 302—50)

The present invention relates to a conveying arrangement for thick-flowing, porous materials of pulpy or mushy consistency, such as wet brewer's or distiller's grains, also known as draff, lees or dregs.

It is often necessary to transport a porous pulpy material through elongated tubing, and it is already known to convey such materials by means of a pneumatic conveyor. However, since the pressures necessary to insure that the gasiform medium will convey the pulpy material in an elongated tube must often reach a substantial magnitude, serious problems are encountered in insuring that the pressure in the pneumatic conveyor is not transmitted to the collecting receptacle or vessel from which the pulpy material is being withdrawn. Since the material is often porous and thus cannot prevent the communication of back pressures to the collecting vessel, the customary worm conveyor which draws the material from the vessel cannot deliver the material to the pneumatic conveyor if the pressure in the pneumatic conveyor and/or the porosity of the conveyed material reach a certain magnitude. For example, it has been determined that the worm or screw of the worm conveyor will be unable to advance the material at a pressure of about one atmosphere absolute pressure in the pneumatic conveyor and if the moisture content of the material is above 75 percent because, at such pressures, the gas utilized for moving the material through the pneumatic conveyor will "backfire" through the worm conveyor and will transform the collecting vessel into a vulcano by ejecting the pulpy material all over the plant in which the vessel is installed. This entails considerable losses in time and represents a serious danger to the workmen. Consequently, all presently known conveying arrangements for wet distiller's grains and like pulpy materials are of rather limited length.

It is an important object of the present invention to provide a conveying arrangement for wet distiller's grains or like wet and porous pulpy materials which is constructed and assembled in such a way as to positively prevent the communication of back pressures to the collecting vessel.

Another object of the invention is to provide a conveying arrangement of the above outlined characteristics which responds automatically to increasing pressures in the pneumatic conveyor in such a way as to seal the latter from the collecting vessel until after the pressure therein drops to a permissible magnitude.

A further object of the invention is to provide a conveying arrangement of the above described type which is capable of transporting a pulpy material through greater distances than the conveying arrangements of presently known design.

An additional object of my invention is to provide a conveying arrangement of the above outlined characteristics which is capable of protecting the worm conveyor and the pneumatic conveyor from excessive pressures and which prevents the communication of back pressures to the collecting vessel in a very simple, efficient and reliable manner.

A concomitant object of the instant invention is to provide an automatic control system for a pneumatic conveyor which is used for the transportation of pulpy materials, the control system being constructed and assembled in such a way that it may be conveniently combined with many conveying arrangements of presently known design.

Still another object of my invention is to provide a control system of the just outlined type which may be readily adjusted to respond to different pressures in the pneumatic conveyor and which is capable of simultaneously controlling the drive for the worm conveyor to prevent damage to the latter when the pneumatic conveyor does not operate in the desired manner.

With the above objects in view, the invention resides in the provision of a conveying arrangement which comprises a worm conveyor adapted to withdraw and to advance a stream of pulpy material from a collecting vessel or another source, a pneumatic conveyor which comprises an elongated tube connected to the discharge end of the worm conveyor and means for introducing one or more blasts of a compressed gasiform medium into the tube to advance the material therethrough, and a control system which includes a preferably plate like control member disposed between the two conveyors and movable between a first and a second position in which it respectively permits and prevents the flow of material to the pneumatic conveyor. The control system further comprises drive means for moving the control member between the aforementioned positions and pressure responsive means connected with the pneumatic conveyor and with the drive means for operating the latter in a sense to move the control member to the first position in response to a predetermined first magnitude of pressure in the pneumatic conveyor, e.g. zero pressure, and to move the control member to the second position in response to a predetermined second magnitude of pressure in the pneumatic conveyor, i.e. a pressure close to that which is likely to be communicated through the worm conveyor and to the collecting vessel.

According to another feature of my invention, the pressure responsive means, e.g. a diaphragm switch and a current reversing relay in the circuit of the drive means, is connected with the drive means for the worm conveyor to arrest the latter when the pneumatic conveyor is sealed from the worm conveyor. This insures that the worm conveyor will not tend to advance pulpy material when the material is not free to enter the pneumatic conveyor.

Figure 2:
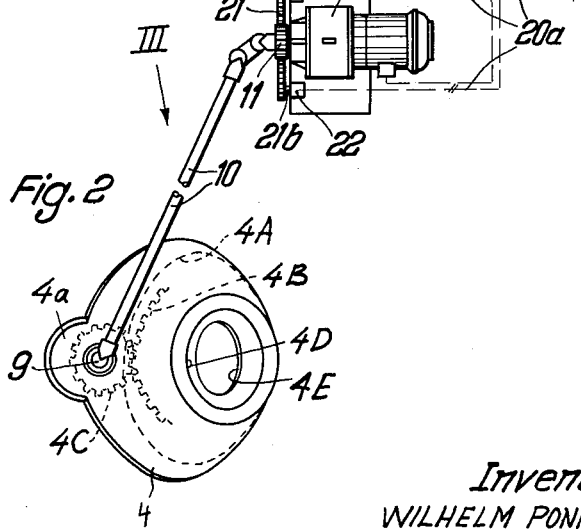

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a somewhat schematic side elevational view of the improved conveying arrangement with certain parts broken away; and FIG. 2 is a fragmentary detail view of the control system as seen in the direction of the arrow X in FIG. 1.

Referring now in greater detail to the drawings, and first to FIG. 1, there is shown a conveying arrangement which comprises three main components, namely, a mechanical conveyor in the form of a worm conveyor I, a pneumatic conveyor II, and a control system III. The mechanical conveyor I comprises a housing 1 which receives porous pulpy material from a source in the form of a collecting vessel or hopper, not shown, and the material is advanced by a worm or screw 1a which is rotatable in the conveyor housing 1 by a drive means here shown as an electric motor 1b. The discharge end of the housing 1 consists of a conical transfer pipe 2 which communicates with an elbow 3, the latter delivering pulpy material into a conical transfer pipe 7 that constitutes the inlet end of an elongated pneumatic conveyor tube 8. At the intake of the transfer pipe 7, there is provided a nozzle 5 which comprises several air supply conduits 6 connected to a source of compressed gas such as an air compressor or blower, not shown, and the discharge orifices in the nozzle 5 are arranged in such a way that they compel the material to pass through the tube 8 in a direction indicated by the arrow Y.

The control system III comprises a control member in the form of a rotary plate 4A (see FIG. 2) which is received in a casing 4 mounted between the elbow 3 and the nozzle 5. The casing has an extension 4a which rotatably receives a pinion 4C meshing with a coaxial gear segment 4B on the control member 4A. The latter is rotatable about a pivot axis 4D and is formed with an eccentric aperture 4E adapted to be aligned with the bore of the nozzle 5 so as to permit the advance of material from the elbow 3 into the transfer pipe 7. The pivot axis 4D is parallel with and spaced from the axis of the nozzle 5. It is assumed that, in the position of FIGS. 1 and 2, the aperture 4E completely exposes the concentric bore in the nozzle 5 so that the flow of material into the tube 8 of the pneumatic conveyor II is unobstructed. However, if the pinion 4C is rotated to turn the control member 4A about the axis 4D, the control member will seal the passage between the elbow 3 and the transfer pipe 7 so that the material is prevented from entering the pneumatic conveyor.

The drive means for moving the control member 4A between the position of FIG. 2 and a position in which the passage through the casing 4 is sealed comprises an electropneumatic assembly which includes a reversible electric motor 12 and a motion transmitting device including a Cardan shaft 10 whose end portions 10a, 10b are respectively connected to the shaft 9 of the pinion 4C and to the drive shaft of the motor 12 so that, depending upon the direction in which the motor rotates, the drive shaft will turn the control member 4A in say clockwise direction to the position of FIG. 2 or in anticlockwise direction to the sealing or material flow-preventing position.

The motor 12 is responsive to rises or drops in pressure prevailing in the nozzle 5, i.e. in the pneumatic conveyor II. One of the supply conduits 6 communicates with a control conduit 13 which branches into lines 14, 16 that are respectively connected to a manometer 15 and to a pressure responsive switch 17. The latter may assume the form of a diaphragm switch of any known design and transmits impulses through a line 18 to a current reversing relay 19. The relay 19 is connected with a non-illustrated source of poly-phase current through a conductor 20, and with two limit switches 22, 23 through conductors 20a. A conductor 20b connects the relay 19 with the motor 12, and the latter's drive shaft carries a coaxial spur gear 11 which meshes with a gear segment 21 rotatably supported on the motor base 12a. The segment 21 carries two spaced trips 21a, 21b for the limit switches 23, 22, respectively.

The control system III operates as follows:

In normal operation of the conveying arrangement, the control member 4A assumes the position of FIG. 2 so that its apertures 4E permits the flow of pulpy material through the casing 4 and into the pneumatic conveyor II where the material is subjected to the advancing action of blasts of compressed air or another gasiform medium which cause the material to pass through the elongated tube 8 to a further processing station or to the dump, as the case may be. The motor 12 is at a standstill, together with the Cardan shaft 10 and with the pinion 4C.

However, if the resistance of material in the tube 8 increases to a predetermined extent, the pressure in the conduits 6 will rise immediately and the conduit 13 transmits such increased pressure to the switch 17 which sends a corresponding impulse through the energizing circuit and to the relay 19. The latter then starts the motor 12 say in clockwise direction and causes the shaft 10 to rotate the pinion 4C and to turn the control member 4A to its sealing position. The trip 21b which is connected in the relay circuit then actuates the limit switch 22 in a sense to arrest the motor 12 after the elapse of a time interval necessary to move the control member 4A to sealing position. The pressure in the tube 8 continues to rise but without in any way affecting the mechanical conveyor I because the latter is sealed from the nozzle 5 by the control member 4A. After a given period of time, the compressed gas evacuates the material from the tube 8 and the pressure drops to zero which causes the switch 17 to transmit to the relay 19 a second impulse in a sense to again start the motor 12 but in the opposite (anticlockwise) direction. The motor now rotates the Cardan shaft 10 and the pinion in a direction to return the control member 4A to the position of FIG. 2 in which the aperture 4E again allows the flow of material from the elbow 3 into the transfer pipe 7. The motor 12 is arrested by the second limit switch 23 under the action of the trip 21a as soon as the control member 4A reaches the position of FIG. 2. When the gear 11 is turned in anticlockwise direction, the trip 21b moves away from and permits the limit switch 22 to return to its quiescent condition. It will be noted that the limit switches 22, 23 arrest the motor 12 in two spaced angular positions respectively corresponding to the operative and idle positions of the control member 4A.

The predetermined pressure necessary for starting the motor 12 in a sense to move the control member 4A to its sealing position is selected in such a way that, at this pressure, the worm 1a is unable to deliver material to the tube 8, i.e. that the resistance to the flow of material in the tube 8 is dangerously close to the point where the compressed gas would "backfire" through the conveyor housing 1 and would eject the material from the vessel which is connected with the intake end of the housing 1. It has been found that the control system III is capable of sealing and again exposing the passage in the casing 4 within extremely short periods of time, usually between 25–30 seconds. Since the operation of the control system is fully automatic, the danger that the compressed gas would penetrate into the mechanical conveyor I is eliminated in an extremely simple and efficient way.

It is not absolutely necessary to arrest the motor 1b of the worm 1a when the control member 4A assumes its sealing position, i.e. the worm 1a may rotate even though it cannot force the material beyond the elbow 3. During the comparatively short intervals when the control member 4A assumes its sealing position, the worm 1a merely grinds the pulpy material provided that the motor 1b is strong enough to rotate the worm under such circumstances. However, in order to prevent any damage to the motor 1b, it is often preferred to provide means for automatically arresting the same as soon as the pressure in the tube 8 rises to the aforementioned magnitude. This is attained by providing in the circuit of the motor 1b a circuit opening relay 24 which is connected in the energizing circuit of the current reversing relay 19 and is responsive to a first impulse when the pressure in the tube 8 increases to thereby open the circuit of the motor 1b, as well as to a second impulse when the pressure in the tube 8 drops to zero to complete the electric circuit and to start the motor 1b. The connection 25 between the circuit-opening relay 24 and the impulse line 18 may be replaced by a direct connection between the relay 24 and the relay 19, if desired.

It will be readily understood that the control system III may be modified in a number of ways. For example, the pressure switch 17 may control a series of suitable valves which are installed in a hydraulic or pneumatic impulse-transmitting assembly and cause the motor 12 or another type of drive means to rotate the control member 4A to its sealing and idle positions. Furthermore, it is not necessary that the control member 4A rotate because it is equally possible to form the control member as a shutter which is reciprocable between its sealing and idle positions. Alternately, the control member could even assume the form of a butterfly valve which is pivotable about an axis perpendicular to the axis of the nozzle 5. The medium for advancing the material in the tube 8 may be air, steam, or any other suitable gas.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

1. An arrangement for conveying pulpy material, such as wet distiller's grains and the like, said arrangement comprising, in combination, a worm conveyor for continuously transporting a stream of pulpy material, said worm conveyor comprising a tubular housing having a discharge end, a worm rotatably received in said housing and a motor connected with and adapted to rotate the worm whereby the latter delivers pulpy material toward said discharge end; a pneumatic conveyor comprising an elongated tube having an inlet end connected with the discharge end of said housing, nozzle means at said inlet end for delivering blasts of a compressed gas into and for advancing the pulpy material through said tube; a control system for automatically sealing said pneumatic conveyor from said worm conveyor in response to a predetermined pressure in said pneumatic conveyor, said control system comprising a casing provided between said discharge end and said inlet end, a plate like control member rotatably received in said casing and formed with aperture means adapted to permit the flow of material from said housing to said tube, pinion means rotatably mounted in said casing and meshing with said control member, said control member rotatable by said pinion means between a first position in which said aperture means permits the flow of material to said tube and a second position in which the control member seals the tube from said housing, drive means for rotating said pinion means in clockwise and anticlockwise directions, said drive means comprising a reversible motor and motion transmitting means coupled with said last mentioned motor and with said pinion means, and pressure responsive means connected with said last mentioned motor and with said nozzle means for operating said last mentioned motor in a first direction to rotate the control member to said first position when the pressure in said nozzle means drops to a predetermined first magnitude and for rotating said last mentioned motor in a second direction to rotate the control member to said second position when the pressure in said nozzle means rises to a predetermined second magnitude; and means operatively connected with said pressure responsive means and with said first mentioned motor means for arresting the latter when the pressure in said nozzle means reaches said second magnitude.

2. An arrangement for conveying pulpy materials, such as wet distiller's grains and the like, said arrangement comprising, in combination, a worm conveyor for continuously transporting a stream of pulpy material; a pneumatic conveyor comprising an elongated tube having an inlet end connected with said worm conveyor for continuously receiving the stream of pulpy material, and nozzle means for introducing blasts of a compressed gasiform medium into said tube and for thereby advancing the material through said tube; and a control system for automatically sealing said pneumatic conveyor from said worm conveyor in response to a predetermined pressure in said pneumatic conveyor, said control system comprising an apertured plate provided between said conveyors and movable in a plane substantially perpendicular to the direction of material flow from said worm conveyor to said pneumatic conveyor between a first position in which the material is free to pass into said pneumatic conveyor and a second position in which the plate seals the pneumatic conveyor from said worm conveyor, drive means for moving said plate between said positions, and pressure responsive means connected with said drive means and with said pneumatic conveyor for operating said drive means in a sense to move the plate to said first position when the pressure in said pneumatic conveyor drops to a predetermined first magnitude and for operating said drive means in a sense to move the plate to said second position when the pressure in said pneumatic conveyor rises to a predetermined second magnitude.

References Cited in the file of this patent

FOREIGN PATENTS 886,268     Germany                Aug. 13, 1953